US012613410B2

(12) United States Patent
Wang et al.

(10) Patent No.: US 12,613,410 B2
(45) Date of Patent: Apr. 28, 2026

(54) DISPLAY DEVICE AND WEARABLE DISPLAY DEVICE THAT ARE CAPABLE OF QUICKLY DETERMINING GAZE POSITIONS AND METHOD FOR DETERMINING GAZE POSITIONS

(71) Applicant: BOE Technology Group Co., Ltd., Beijing (CN)

(72) Inventors: Lei Wang, Beijing (CN); Xuan Feng, Beijing (CN); Yapeng Li, Beijing (CN); Yunke Qin, Beijing (CN); Wenhao Tian, Beijing (CN); Jiankang Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 849 days.

(21) Appl. No.: 17/789,549

(22) PCT Filed: May 27, 2021

(86) PCT No.: PCT/CN2021/096420
§ 371 (c)(1),
(2) Date: Jun. 28, 2022

(87) PCT Pub. No.: WO2022/246743
PCT Pub. Date: Dec. 1, 2022

(65) Prior Publication Data
US 2024/0201488 A1    Jun. 20, 2024

(51) Int. Cl.
G02B 27/00    (2006.01)
G02B 27/01    (2006.01)
G02B 27/09    (2006.01)

(52) U.S. Cl.
CPC ..... *G02B 27/0093* (2013.01); *G02B 27/0172* (2013.01); *G02B 27/0922* (2013.01); *G02B 27/0955* (2013.01); *G02B 27/0988* (2013.01)

(58) Field of Classification Search
CPC ........................ G02B 27/0093; G02B 27/0172
See application file for complete search history.

(56) References Cited

U.S. PATENT DOCUMENTS

2016/0011655 A1    1/2016    Ji et al.
2018/0322831 A1*  11/2018    Kim ..................... G09G 3/3266
(Continued)

FOREIGN PATENT DOCUMENTS

CN    104123925 A    10/2014
CN    107223276 A    9/2017
(Continued)

*Primary Examiner* — Lauren Nguyen
(74) *Attorney, Agent, or Firm* — Lippes Mathias LLP

(57) ABSTRACT

Provide is a display device including a display panel, a plurality of photoelectric sensor assemblies, and a processing circuit. The display panel includes a display region and a peripheral region surrounding the display region. The plurality of photoelectric sensor assemblies are disposed in the peripheral region, wherein each of the photoelectric sensor assemblies is configured to receive an optical signal reflected via eyes of a user and convert the optical signal into an electric signal. The processing circuit is connected to each of the photoelectric sensor assemblies, wherein the processing circuit is configured determine a gaze position of the eyes of the user on the display panel based on a signal value of the electric signal transmitted by each of the photoelectric sensor assemblies and a position of at least one of the photoelectric sensor assemblies.

18 Claims, 8 Drawing Sheets

(56)                    References Cited

U.S. PATENT DOCUMENTS

2019/0163267  A1       5/2019  Hainzl et al.
2019/0250707  A1*      8/2019  Kondo ............... G02B 27/0179
2020/0110271  A1*      4/2020  Komogortsev ...... G02B 27/017

FOREIGN PATENT DOCUMENTS

| CN | 109256042 A | 1/2019 | | |
|---|---|---|---|---|
| CN | 109416572 A | 3/2019 | | |
| CN | 111766702 A | 10/2020 | | |
| JP | 2006-120921 | * 5/2006 | .......... | H01L 27/146 |
| JP | 2011-27843 | * 1/2011 | .......... | G02F 1/1345 |
| WO | WO-2017-134864 | * 10/2017 | ............... | G02B 5/20 |

* cited by examiner

0126

01221   01222   01223   01224   01225   01226     0124

0122

X

0122 drive circuit 013 processor 015

Y

0123/0124

011   011a   011b

DISPLAY DEVICE AND WEARABLE DISPLAY DEVICE THAT ARE CAPABLE OF QUICKLY DETERMINING GAZE POSITIONS AND METHOD FOR DETERMINING GAZE POSITIONS

CROSS-REFERENCE TO RELATED APPLICATION

This application is a 371 of PCT application No. PCT/CN2021/096420, filed on May 27, 2021, the content of which is herein incorporated by reference in its entirety.

TECHNICAL FIELD

The present disclosure relates to the field of virtual reality technologies, and in particular, relates to a display device, a wearable display device, and a method for determining gaze positions.

BACKGROUND

A virtual reality (VR) device refers to a device that is capable of creating a virtual environment based on displayed images and exerting an immersive feeling for the user in the virtual environment.

SUMMARY

Embodiments of the present disclosure provides a display device, a wearable display device, and a method for determining gaze positions.

In one aspect of the embodiments of the present disclosure, a display device is provided. The display device includes:

a display panel, including a display region and a peripheral region surrounding the display region;

a plurality of photoelectric sensor assemblies, disposed in the peripheral region, wherein each of the photoelectric sensor assemblies is configured to receive an optical signal reflected via eyes of a user and convert the optical signal into an electric signal; and a processing circuit, connected to each of the photoelectric sensor assemblies, wherein the processing circuit is configured to determine a gaze position of the eyes of the user on the display panel based on a signal value of the electric signal transmitted by each of the photoelectric sensor assemblies and a position of at least one of the photoelectric sensor assemblies.

In some embodiments, the peripheral region includes: a first region extending along a first direction and a second region extending along a second direction, wherein the first direction is intersected with the second direction; and the plurality of photoelectric sensor assemblies include a plurality of first photoelectric sensor assemblies and a plurality of second photoelectric sensor assemblies;

wherein the plurality of first photoelectric sensor assemblies are disposed in the first region and arranged along the first direction, and the plurality of second photoelectric sensor assemblies are disposed in the second region and arranged along the second direction.

In some embodiments, the first direction is perpendicular to the second direction; and the peripheral region includes: two first regions and two second regions;

wherein the two first regions are arranged along the second direction and respectively disposed on two sides of the display region, and the two second regions are arranged along the first direction and respectively disposed on the two sides of the display region.

In some embodiments, the processing circuit is configured to:

determine first coordinate values of a target first photoelectric sensor assembly transmitting an electric signal with a minimum signal value in the plurality of first photoelectric sensor assemblies;

determine second coordinate values of a target second photoelectric sensor assembly transmitting an electric signal with a minimum signal value in the plurality of second photoelectric sensor assemblies; and determine the gaze position of the eyes of the user on the display panel based on the first coordinate values and the second coordinate values.

In some embodiments, the display device further includes a control circuit; and each of the photoelectric sensor assemblies includes: a switch transistor and a photodiode; wherein the photodiode includes: a base, and a pixel electrode, a P-type material layer, a photosensitive layer, a N-type material layer and a common electrode that are disposed on a side of the base and successively stacked along a direction away from the base; and a first electrode of the switch transistor is electrically connected to the pixel electrode, a second electrode of the switch transistor is electrically connected to the processing circuit, a control electrode of the switch transistor is electrically connected to the control circuit, and the control circuit is configured to control on or off of the switch transistor.

In some embodiments, the display panel includes a plurality of subpixels disposed in the display region, each of the subpixels including at least one pixel transistor;

wherein the switch transistor and the pixel transistor are prepared by a same preparation process.

In some embodiments, each of the photoelectric sensor assemblies includes: a first bonding pattern and a second bonding pattern that are electrically connected;

wherein the first bonding pattern is electrically connected to the first electrode of the switch transistor, and the second bonding pattern is electrically connected to the pixel electrode of the photodiode.

In some embodiments, the processing circuit is a drive circuit, wherein the drive circuit is further configured to drive, based on the gaze position of the eyes of the user on the display panel, the display panel to display images.

In some embodiments, the pixel electrode is distal from the display panel relative to the common electrode, and the pixel electrode is made of a transparent material.

In some embodiments, the display device further includes a flexible circuit board attached to the peripheral region;

wherein the switch transistor is disposed on the flexible circuit board.

In some embodiments, the processing circuit is a processor; and the display device further includes a drive circuit connected to the processor;

wherein the processor is further configured to transmit the gaze position of the eyes of the user on the display panel to the drive circuit, and the drive circuit is configured to drive, based on the gaze position, the display panel to display the images.

In some embodiments, the common electrode is distal from the display panel relative to the pixel electrode, and the common electrode is made of a transparent material.

In some embodiments, the display device further includes: a plurality of filters in one-to-one correspondence to the plurality of photoelectric sensor assemblies, each of the filters being disposed on a side, distal from the display panel, of a corresponding photoelectric sensor assembly;

wherein the filter is configured to transmit infrared light and absorb visible light.

In another aspect of the embodiments of the present disclosure, a wearable display device is provided, and the wearable display device includes: a display device as defined above, a lens disposed on a display side of the display device, and a plurality of light-emitting elements disposed on an edge of the lens;

wherein light-exiting directions of the plurality of light-emitting elements face away from the display device.

In some embodiments, the plurality of light-emitting elements are infrared light-emitting diodes.

In yet another aspect of the embodiments of the present disclosure, a method for determining gaze positions is provided, applicable to the display device as defined above. The method includes:

receiving an optical signal reflected via eyes of a user;

converting the optical signal into an electric signal; and determining a gaze position of the eyes of the user on the display panel based on a signal value of the electric signal and a position of at least one photoelectric sensor assembly.

In some embodiments, determining the gaze position of the eyes of the user on the display panel based on the electric signal includes:

determining, by a drive circuit in the display device, the gaze position of the eyes of the user on the display panel based on the electric signal; and the method further includes: transmitting, by the drive circuit, the gaze position to a processor of the display device;

rendering, by the processor, an image to be displayed in the display device based on the gaze position, and transmitting the rendered image to be displayed to the drive circuit; and driving, by the drive circuit, the display panel to display the rendered image to be displayed.

In some embodiments, determining the gaze position of the eyes of the user on the display panel based on the electric signal includes:

determining, by a processor in the display device, the gaze position of the eyes of the user on the display panel based on the electric signal; and the method further includes:

rendering, by the processor, an image to be displayed in the display device based on the gaze position, and transmitting the rendered image to be displayed to a drive circuit; and driving, by the drive circuit, the display panel to display the rendered image to be displayed.

In some embodiments, determining the gaze position of the eyes of the user on the display panel based on the electric signal includes:

determining at least one target first photoelectric sensor assembly from a plurality of first photoelectric sensor assemblies arranged along a first direction;

determining at least one target second photoelectric sensor assembly from a plurality of second photoelectric sensor assemblies arranged along a second direction; and determining the gaze position of the eyes of the user on the display panel based on a position of each of the target first photoelectric sensor assemblies and a position of each of the target second photoelectric sensor assemblies;

wherein a signal value of an electric signal transmitted by the target first photoelectric sensor assembly is less than or equal to a first threshold, and a signal value of an electric signal transmitted by the target second photoelectric sensor assembly is less than or equal to a second threshold.

In some embodiments, determining the gaze position of the eyes of the user on the display panel based on the electric signal includes:

determining first coordinate values of the target first photoelectric sensor assembly transmitting an electric signal with a minimum signal value in the plurality of first photoelectric sensor assemblies arranged along the first direction;

determining second coordinate values of the target second photoelectrical sensor assembly transmitting an electric signal with a minimum signal value in the plurality of second photoelectric sensor assemblies arranged along the second direction; and determining the gaze position of the eyes of the user on the display panel based on the first coordinate values and the second coordinate values;

wherein the first direction is intersected with the second direction.

In still another aspect of the embodiments of the present disclosure, a non-transitory computer-readable storage medium storing one or more instructions is provided. The one or more instructions, when executed by a display device, cause the display device to perform the method for determining gaze positions as defined above.

In yet still another aspect of the embodiments of the present disclosure, a computer program product including instructions is provided. The computer program product, when running on a computer, causes the computer to perform the method for determining gaze positions as defined above.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

In the related art, a VR device includes a display panel, a camera, a processor, and a drive circuit. The camera is configured to capture an eye image of the user. The processor is configured to determine a gaze position of the user on the display panel according to the eye image, and partially render the image to be displayed according to the gaze position. The drive circuit is configured to drive the display panel to display the received partially rendered display image. Because the processor may only partially render the region of a gaze point in the display image and does not need to globally render the to-be-displayed image, not only a load of the processor may be reduced, but also a display effect of the display panel may be ensured.

However, in the related art, the processor is less efficient in determining the gaze position according to the eyes image taken by the camera, thereby resulting in a lower display efficiency of the display panel.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

Figure 1:
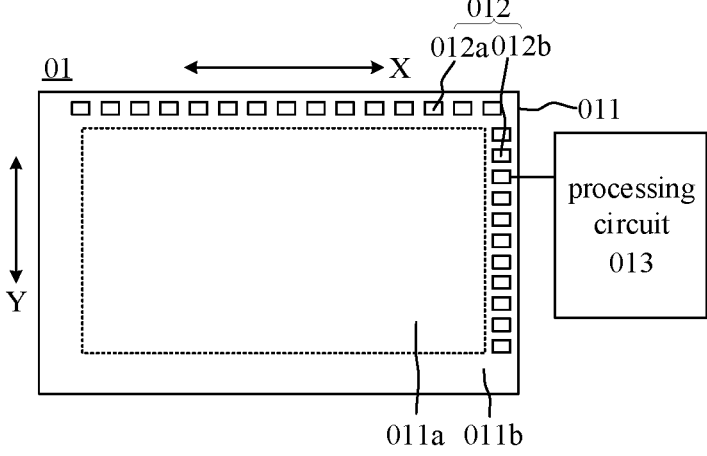
FIG. 1 is a schematic structural diagram of a display device according to an embodiment of the present disclosure.

FIG. 1 is a schematic structural diagram of a display device according to an embodiment of the present disclosure. Referring to FIG. 1, the display device 01 may include: a display panel 011, a plurality of photoelectric sensor assemblies 012, and a processing circuit 013.

The display panel 011 includes a display region 011*a* and a peripheral region 011*b* surrounding the display region 011*a*. The plurality of photoelectric sensor assemblies 012 may be disposed in the peripheral region 011*b*, wherein each of the photoelectric sensor assemblies 012 is configured to receive an optical signal reflected via eyes of a user, and convert the optical signal into an electric signal.

The processing circuit 013 may be connected to each of the photoelectric sensor assemblies 012, and the processing circuit 013 may receive the electric signal transmitted by each of the photoelectric sensor assemblies 012. The processing circuit 013 is configured to determine a gaze position of the eyes of the user on the display panel 011 based on a signal value of the electric signal transmitted by each of the photoelectric sensor assemblies 012 and a position of at least one of the photoelectric sensor assemblies 012. FIG. 1 only shows that the processing circuit 013 is connected to one of the photoelectric sensor assemblies 012, in fact the processing circuit 013 is connected to each of the photoelectric sensor assemblies 012. In this way, the processing circuit 013 receives the electric signal transmitted by each of the photoelectric sensor assemblies 012.

In the embodiment of the present disclosure, the processing circuit 013 may pre-store positions of the photoelectric sensor assemblies 012. Because different regions of human eyes are different in reflectivity to light (e.g., infrared light), the optical signals, reflected via different regions of the human eyes, received by the photoelectric sensor assembly 012 are different. The photoelectric sensor assemblies 012 have different signal values of electric signals converted from different optical signals. In this way, the processing circuit 013 may determine the gaze position of the eyes of the user on the display panel 011 based on the signal value of the electric signal and the position of the photoelectric sensor assembly 012.

In general, an amount of data of the electric signals is small, whereas an amount of data of images is large. Therefore, an efficiency of the processing circuit 013 in processing the electric signals is higher than an efficiency of the processing circuit 013 in processing the images. In the embodiment of the present disclosure, the processing circuit 013 has a high efficiency in processing the electric signal transmitted by each of the photoelectric sensor assemblies 012, and may quickly determine the gaze position of the eyes of the user on the display panel 011. In this way, an efficiency of displaying the images by the display panel 011 is further improved, and thus a higher refresh rate of the display 011 is achieved.

Moreover, because the plurality of photoelectric sensor assemblies 012 are disposed in the peripheral region 011*b* of the display panel 011, a normal display of the display panel 011 is not affected by the plurality of photoelectric sensor assemblies 012, and thus a display effect of the display panel 011 is better.

In summary, the embodiment of the present disclosure provides a display device. Because the processing circuit in the display device has the high efficiency in processing the electric signal transmitted by each of the photoelectric sensor assemblies, the processing circuit may quickly determine the gaze position of the eyes of the user on the display panel based on the electric signal transmitted by each of the photoelectric sensor assemblies. In this way, the efficiency of displaying the images by the display panel is further improved, and thus the higher refresh rate of the display panel is achieved.

Figure 2:
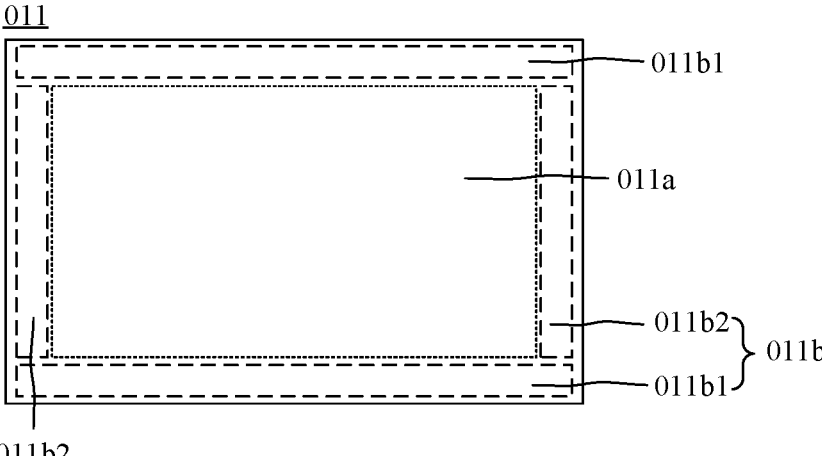
FIG. 2 is a top view of a display panel according to an embodiment of the present disclosure.

FIG. 2 is a top view of a display panel according to an embodiment of the present disclosure. Referring to FIG. 2, the peripheral region 011*b* of the display panel 011 includes: a first region 011*b*1 extending along a first direction X and a second region 011*b*2 extending along a second direction Y. The first direction X is intersected with the second direction Y.

Referring to FIGS. 1 and 2, the plurality of photoelectric sensor assemblies 012 may include: a plurality of first photoelectric sensor assemblies 012*a* and a plurality of second photoelectric sensor assemblies 012*b*. The plurality of first photoelectric sensor assemblies 012*a* are disposed in the first region 011*bi* and arranged along the first direction X. The plurality of second photoelectric sensor assemblies 012*b* are disposed in the second region 011*b*2 and arranged along the second direction Y.

In some embodiments, the plurality of first photoelectric sensor assemblies 012*a* are arranged evenly along the first direction X, and the plurality of second photoelectric sensor assemblies 012*b* are arranged evenly along the second direction Y.

In the embodiment of the present disclosure, the processing circuit 013 may receive an electric signal transmitted by each of the plurality of first photoelectric sensor assemblies 012*a*, and may determine at least one target first photoelectric sensor assembly from the plurality of first photoelectric sensor assemblies 012*a*. The processing circuit 013 may also receive an electric signal transmitted by each of the plurality of second photoelectric sensor assemblies 012*b*, and may determine at least one target second photoelectric sensor assembly from the plurality of second photoelectric sensor assemblies 012*b*. Finally, the processing circuit 013 may determine the gaze position of the eyes of the user on the display panel 011 based on a position of the at least one target first photoelectric sensor assembly and a position of the at least one target second photoelectric sensor assembly.

A signal value of an electric signal transmitted by the target first photoelectric sensor assembly may be less than or equal to a first threshold, and a signal value of an electric signal transmitted by the target second photoelectric sensor assembly may be less than or equal to a second threshold. The first threshold may be equal or not equal to the second threshold, which is not limited herein.

The eye of the user includes a pupil, a sclera, and an iris, and the gaze position of the eyes of the user on the display panel 011 is a gaze position of the pupil on the display panel. Due to the deepest color of the pupil, an optical signal reflected via the pupil is minimum. Furthermore, an electric signal converted from the optical signal reflected via the pupil is minimum. Therefore, the gaze position of the pupils of the eyes of the user on the display panel 011 may be determined based on the signal value of the electric signal transmitted by the target first photoelectric sensor assembly which is less than or equal to the first threshold and the signal value of the electric signal transmitted by the target second photoelectric sensor assembly which is less than or equal to the second threshold.

In some embodiments, the first threshold and the second threshold may be pre-stored fixed values in the processing circuit 013. Alternatively, the first threshold may be determined by the processing circuit 013 according to signal values of the received electric signals of the plurality of first photoelectric sensor assemblies 012*a*. The second threshold may be determined by the processing circuit 013 according to signal values of the received electric signals of the plurality of second photoelectric sensor assemblies 012*b*.

Illustratively, the processing circuit 013 may sort signal values of N electric signals transmitted by N first photoelectric sensor assemblies 012*a* in an ascending order, and determine a signal value in the $n^{th}$ position as the first threshold. N is an integer greater than 1, and n is an integer greater than 1 and less than N/2. The processing circuit 013 may sort signal values of M electric signals transmitted by M second photoelectric sensor assemblies 012*b* in the ascending order, and determine a signal value in the $m^{th}$ position as the second threshold. M is an integer greater than 1, and m is an integer greater than 1 and less than M/2.

In some embodiments, the processing circuit 013 determines a minimum of signal values of the received electric signals of the plurality of first photoelectric sensor assemblies 012*a* as the first threshold, and determines a minimum of the signal values of the received electric signals of the plurality of second photoelectric sensor assemblies 012*b* as the second threshold.

In the embodiment of the present disclosure, the processing circuit 013 may determine first coordinate values of the target first photoelectric sensor assembly transmitting the electric signal with the minimum signal value of the plurality of first photoelectric sensor assemblies 012*a*, and may determine second coordinate values of the target second photoelectric sensor assembly transmitting the electric signal with the minimum signal value of the plurality of second photoelectric sensor assemblies 012*b*. The processing circuit 013 may determine the gaze position of the eyes of the user on the display panel 011 based on the first coordinate values and the second coordinate values.

In the embodiment of the present disclosure, referring to FIG. 2, the first direction X is perpendicular to the second direction Y. The first direction X may be a pixel row direction of the display panel 011, and the second direction Y may be a pixel column direction of the display panel 011.

Figure 3:
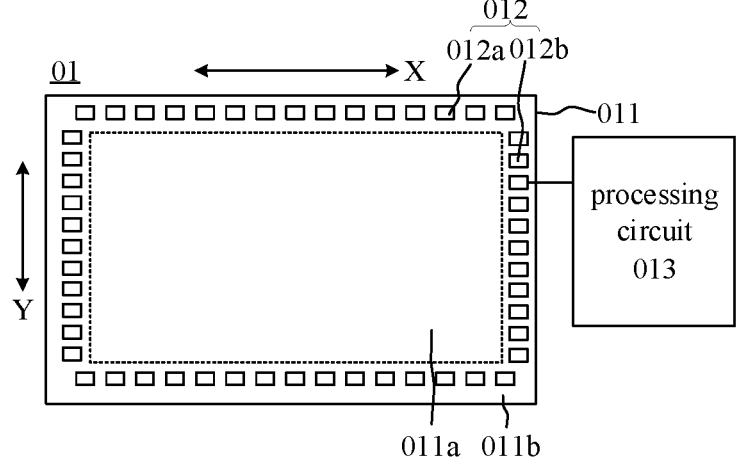
FIG. 3 is a schematic structural diagram of another display device according to an embodiment of the present disclosure.

Referring to FIG. 2, the peripheral region 011*b* may include two first regions 011*b*1 and two second regions 011*b*2. The two first regions 011*bi* may be arranged along the second direction Y and respectively disposed on two sides of the display region 011*a*. The two second regions 011*b*2 may be arranged along the first direction X and respectively disposed on the two sides of the display region 011*a*. Correspondingly, referring to FIG. 3, in the plurality of first photoelectric sensor assemblies 012*a* of the plurality of photoelectric sensor assemblies 012, one portion of the first photoelectric sensor assemblies 012*a* are disposed in one of the first regions 011*b*1, and the other portion of the first photoelectric sensor assemblies 012*a* are disposed in the other of the first regions 011*b*1. In the plurality of second photoelectric sensor assemblies 012*b* of the plurality of photoelectric sensor assemblies 012, one portion of the second photoelectric sensor assemblies 012*b* are disposed in one of the second regions 011*b*2, and the other portion of the second photoelectric sensor assemblies 012*b* are disposed in the other of the second regions 011*b*2.

Therefore, the processing circuit 013 may determine the gaze position of the eyes of the user on the display panel 011 based on the first photoelectric sensor assemblies 012*a* of the two first regions 011*bi* and the second photoelectric sensor assemblies 012*b* of the two second regions 011*2*, thereby improving an accuracy of the determined gaze position.

Figure 4:
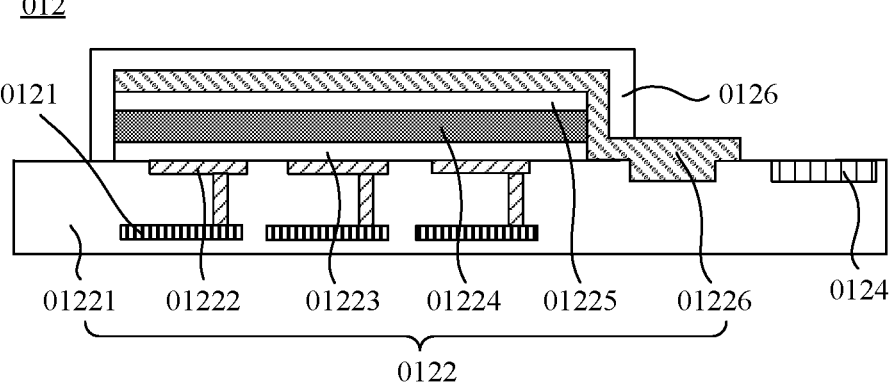
FIG. 4 is a schematic diagram of a photoelectric sensor assembly according to an embodiment of the present disclosure.

In the embodiment of the present disclosure, the display device 01 may further include a control circuit. FIG. 4 is a schematic diagram of a photoelectric sensor assembly according to an embodiment of the present disclosure. Referring to FIG. 4, the photoelectric sensor assembly 013 may include: a switch transistor 0121 and a photodiode 0122.

In some embodiments, the photodiode 0122 may be a hydrogenated amorphous silicon diode or an organic photodiode (OPD). A response of the organic photodiode to the infrared light is better than a response of the hydrogenated amorphous silicon diode to the infrared light.

The embodiments of the present disclosure are described by using an example in which the photodiode 0122 is an organic photodiode. Referring to FIG. 4, the photodiode 0122 includes: a base 01221, and a pixel electrode 01222, a P-type material layer 01223, a photosensitive layer 01224, a N-type material layer 01225, and a common electrode 01226 that are disposed on a side of the base 01221, and are successively stacked along a direction away from the base 01221.

Figure 5:
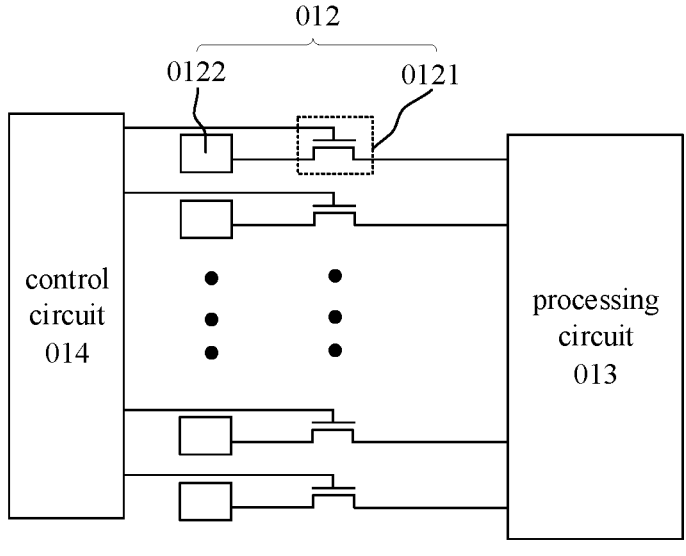
FIG. 5 is a schematic diagram of a photoelectric sensor assembly, a processing circuit and a control circuit according to an embodiment of the present disclosure.

Refereeing to FIG. 5, a first electrode of the switch transistor 0121 is electrically connected to the pixel electrode 01222, a second electrode of the switch transistor 0121 is electrically connected to the processing circuit 013, a control electrode of the switch transistor 0121 is electrically connected to the control circuit 014, and the control circuit 014 is configured to control on or off of the switch transistor 0121. The base 01221 may be made of glass. FIG. 4 only shows that the first electrode of the switch transistor 0121 is electrically connected to the pixel electrode 01222, and the switch transistor 0121 electrically connected to the processing circuit 013 and the control circuit 014 is not shown in FIG. 4.

In some embodiments, the photodiode 0122 may further include a drive chip disposed on the side of the base 01221 and a connection trace disposed on a same layer with the pixel electrode 01222. One end of the connection trace is connected to the drive chip, and the other end of the connection trace is connected to common electrode 01225. The drive chip is configured to supply a signal to the common electrode 01226 by the connection trace.

In the case that the drive chip supplies the signal to the common electrode 01226, the photodiode 0122 converts the optical signal into an electric signal upon receiving the optical signal reflected via the eyes of the user. The control circuit 014 controls the switch transistor 0121 to turn on, and the electric signal is transmitted to the processing circuit 013 by the switch transistor 0121.

In the embodiment of the present disclosure, the display panel 011 includes a plurality of subpixels disposed in the display region 011*a*, each of the subpixels including at least one pixel transistor.

Figure 6:
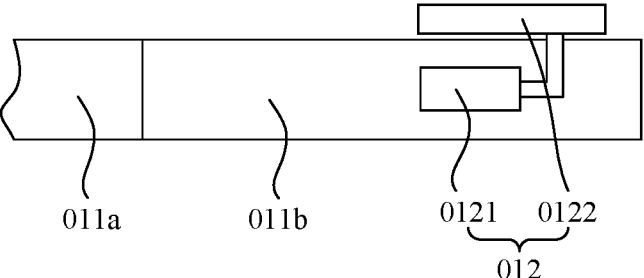
FIG. 6 is a schematic local diagram of a display device according to an embodiment of the present disclosure.

In some embodiments, the switch transistor 0121 of the photoelectric sensor assembly 012 and the pixel transistor may be prepared by a same preparation process. That is, referring to FIG. 6, the switch transistor 0121 of the photoelectric sensor assembly 012 may be integrated into the display panel 011.

Figure 7:
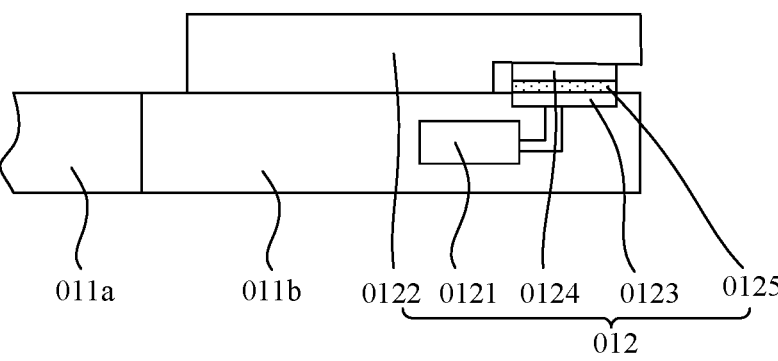
FIG. 7 is a schematic local diagram of another display device according to an embodiment of the present disclosure.

FIG. 7 is a section diagram of a display panel and a photoelectric sensor assembly according to an embodiment of the present disclosure. Referring to FIG. 7, the photoelectric sensor assembly 012 may include a first bonding pattern 0123 and a second bonding pattern 0124 that are electrically connected. The first bonding pattern 0123 may be electrically connected to the first electrode of the switch transistor 0121, and the second bonding pattern 0124 may be electrically connected to the pixel electrode 01222 of the photodiode 0122. In this way, the first electrode of the switch transistor 0121 of the photoelectric sensor assembly 012 is electrically connected to the pixel electrode 01222 of the photodiode 0122, by disposing the first bonding pattern 0123 and the second bonding pattern 0124.

In some embodiments, an anisotropic conductive film (ACF) 0125 may be disposed between the first bonding pattern 0123 and the second bonding pattern 0124. The first bonding pattern 0123 is bonded and connected to the second bonding pattern 0124 by the ACF.

In some embodiments, the pixel electrode 01222, the common electrode 01226, the first bonding pattern 0123, and the second bonding pattern 0124 are all made of conductive materials, thereby ensuring effective transmission of the signal.

Figure 8:
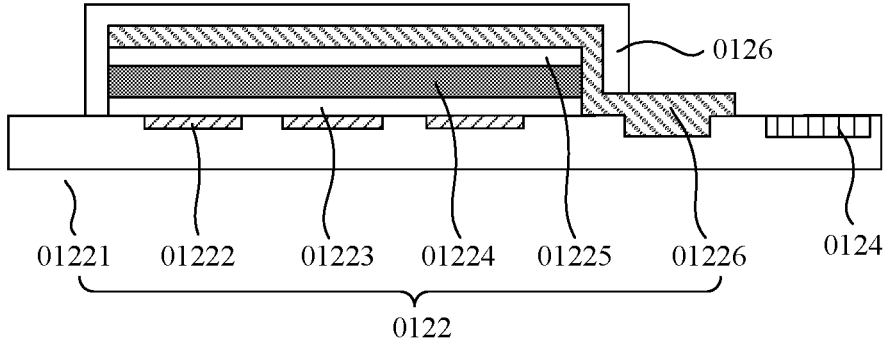
FIG. 8 is a schematic diagram of a photodiode according to an embodiment of the present disclosure.

FIG. 8 is a schematic diagram of a photodiode and a second bonding pattern according to an embodiment of the present disclosure. Referring to FIG. 8, the second bonding pattern 0124 may be disposed in a same layer with pixel electrode 01222 of the photodiode 0122, and a gap is formed between the second bonding pattern 0124 and the pixel electrode 01222.

Referring to FIGS. 4 and 8, the photoelectric sensor assembly 012 may further include an encapsulation layer 0126. The encapsulation layer 0126 may be disposed on a side, distal from the base 01221, of the common electrode 01226, and configured to package the photodiode 0122, thereby preventing the photodiode 0122 from being damaged.

Figure 9:
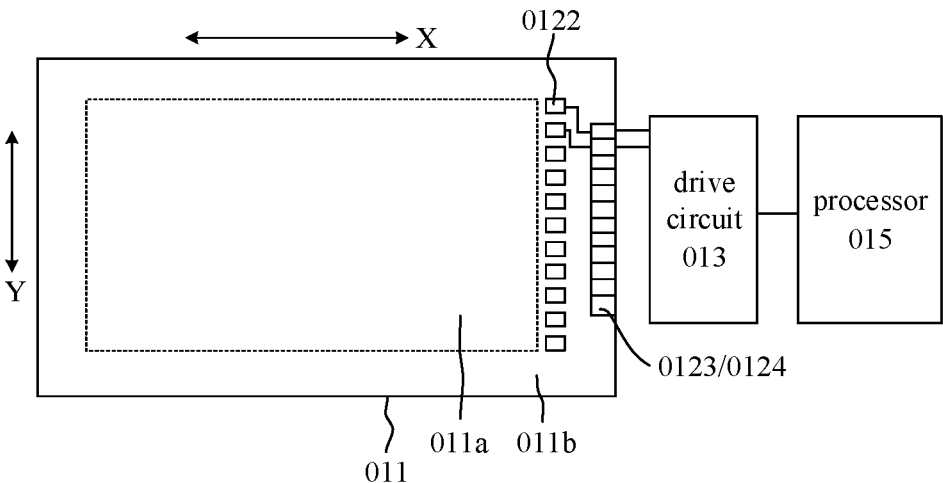
FIG. 9 is a schematic structural diagram of yet another display device according to an embodiment of the present disclosure.

In this embodiment, referring to FIG. 9, the processing circuit 013 may be the drive circuit (drive IC). The drive circuit 013 may also drive, based on the gaze position of the eyes of the user on the display panel 011, the display panel 011 to display the images, in the case that the drive circuit 013 determines the gaze position of the eyes of the user on the display panel 011 based on the electric signal transmitted by each of the photoelectric sensor assemblies 012.

In some embodiments, referring to FIG. 9, the display device 01 may further include a processor 015 connected to the drive circuit 013. In the case that the drive circuit 013 determines the gaze position of the eyes of the user on the display panel 011 based on the electric signal transmitted by each of the photoelectric sensor assemblies 012, the gaze position of the eyes of the user on the display panel 011 may be transmitted to the processor 015. The processor 015 may partially render an image to be displayed in the display panel 011 based on the gaze position, and transmit the partially rendered image to the drive circuit 013. The drive circuit 013 may drive the display panel 011 to display the received partially rendered image.

When the processor 015 partially renders the image to be displayed in the display panel 011, a region where the gaze position is disposed in the image to be displayed may only be rendered. In this way, not only a load of the processor 015 is reduced, but also the display effect of the display panel 011 is ensured.

It should be noted that, an orthographic projection of the first bonding pattern 0123 on the display panel 011 may be overlapped with an orthographic projection of the second bonding pattern 0124 on the display panel 011. Therefore, FIG. 9 takes a block to present the first bonding pattern 0123 and the second bonding pattern 0124, and shows the first bonding pattern 0123 and the second bonding pattern 0124 by 0123/0124. Moreover, the switch transistor 0121 is not shown in FIG. 9. In addition, FIG. 9 only shows the photodiodes 0122 of one portion of the photoelectric sensor assemblies 012, and only shows that two photodiodes 0122 are connected to the drive circuit 013 by the first bonding pattern 0123 and the second bonding pattern 0124. In fact, the photodiode 0122, the first bonding pattern 0123, and the second bonding pattern 0124 all may be disposed on four sides of the peripheral region 011b, and each of the photodiodes 0122 may be connected to the drive circuit 013.

In this embodiment, the pixel electrode 01222 in the photodiode 0122 is distal from the display panel 011 relative to the common electrode 01226. That is, light reflected via the eyes of the user is incident from a side of the pixel electrode 01222. Therefore, to ensure the photodiode 0122 receives the optical signal reflected via the eyes of the user, the pixel electrode 01222 needs to be made of a transparent material. For example, the pixel electrode 01222 is made of an indium tin oxide (ITO).

In some embodiments, the common electrode 01226 may be made of a transparent material or a non-transparent material, which is not limited in the embodiment of the present disclosure.

In the embodiment of the present disclosure, the display panel 011 may be a liquid crystal display (LCD) panel. The liquid crystal display panel includes an array substrate, a color filter substrate, and a liquid crystal layer disposed between the array substrate and the color filter substrate. Because the pixel transistors of the subpixels of the display panel 011 are generally integrated into the array substrate, the switch transistor 0121 may also be integrated into the array substrate, such that the switch transistor 0121 of the photoelectric sensor assembly 102 and the pixel transistor are prepared by the same preparation process. That is, in the process of preparing the array substrate, the pixel transistor of the subpixel and the switch transistor 0121 of the photoelectric sensor assembly 012 are prepared.

In this embodiment, the display panel 011 may also be an organic light-emitting diode (OLED) display panel or a light-emitting diode (LED) display panel, which is not limited herein. In the case that the display panel 011 is the OLED display panel 011 or the LED display panel 011, the switch transistor 0121 of the photoelectric sensor assembly 012 only needs to be disposed in the peripheral region 011b of the display panel 011.

Figure 11:
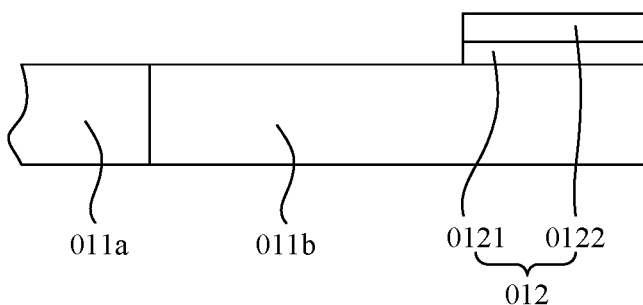
FIG. 11 is a schematic local diagram of yet another display device according to an embodiment of the present disclosure.

In some embodiments, referring to FIG. 11, the display panel 011 may further include a flexible circuit board 016 attached to the peripheral region 011b. The switch transistor 0121 of the photoelectric sensor assembly 012 is disposed on the flexible circuit board 015. That is, referring to FIG. 11, the switch transistor 0121 of the photoelectric sensor assembly 012 is prepared independently of the display panel 011, and is not integrated into the display panel 011. The switch transistor 0121 of the photoelectric sensor assembly 012 and the pixel transistor are not prepared by the same preparation process.

Figure 10:
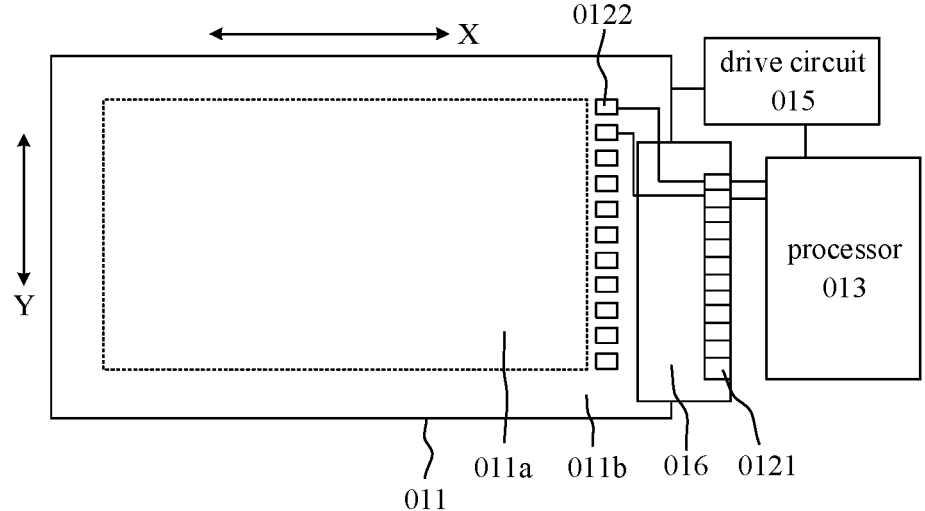
FIG. 10 is a schematic structural diagram of still another display device according to an embodiment of the present disclosure.

In this embodiment, referring to FIG. 10, the processing circuit 013 may be a processor. For example, the processor 013 is a central processing unit (CPU), a graphics processing unit (GPU), or an application processor (AP).

In some embodiments, referring to FIG. 10, the display device 01 may further include the drive circuit 015 connected to the processor 013. In the case that the processor 013 determines the gaze position of the eyes of the user on the display panel 011 based on the electric signal transmitted by each of the photoelectric sensor assemblies 012, the image to be displayed in the display panel 011 may be partially rendered based on the gaze position, and the partially rendered image to be displayed is transmitted to the drive circuit 015. The drive circuit 015 may drive the display panel 011 to display the received partially rendered image.

When the processor 013 partially renders the image to be displayed in the display panel 011, only the region where the gaze position is disposed in the image to be displayed is rendered. In this way, not only a load of the processor 013 is reduced, but also the display effect of the display panel 011 is ensured.

It should be noted that, FIG. 10 only shows the photodiodes 0122 and the switch transistors 0121 of one portion of the photoelectric sensor assemblies 012, and only shows that two photodiodes 0122 are connected to the drive circuit 013 by the switch transistor 0121. In fact, the photodiode 0122 may be disposed on the four sides of the peripheral region 011b, and each of the photodiodes 0122 may be connected to the processor 013 by the flexible circuit board 016.

In the embodiment, the common electrode 01226 of the photodiode 0122 is distal from the display panel 011 relative to the pixel electrode 01222. That is, the light reflected via the eyes of the user is incident from a side of the common electrode 01226. Therefore, the common electrode 01226 needs to be made of the transparent material, such that the photodiode 0122 receives the optical signal reflected via the eyes of the user. For example, the common electrode 01226 is made of the ITO.

In some embodiments, the pixel electrode 01222 may be made of a transparent material or a non-transparent material, which is not limited herein.

In the embodiment of the present disclosure, the display panel 011 may be the LCD display panel. The liquid crystal display panel includes the array substrate, the color filter substrate, and the liquid crystal layer disposed between the array substrate and the color filter substrate. In general, an orthographic projection of the color filter substrate on the array substrate and an orthographic projection of the liquid crystal layer on the array substrate are both within the array substrate, and the array substrate also includes a region that is not overlapped with both the color filter substrate and the liquid crystal layer.

Figure 12:
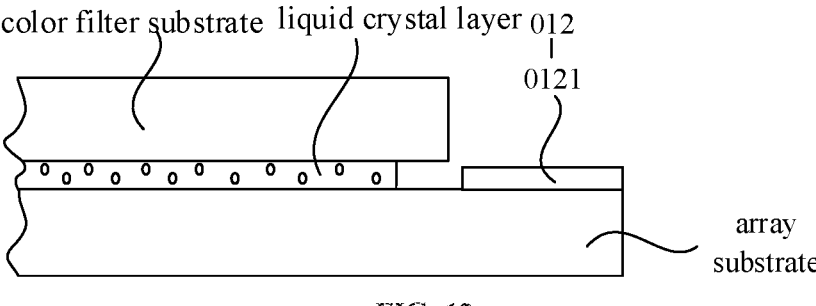
FIG. 12 is a schematic local diagram of still another display device according to an embodiment of the present disclosure.
Figure 13:
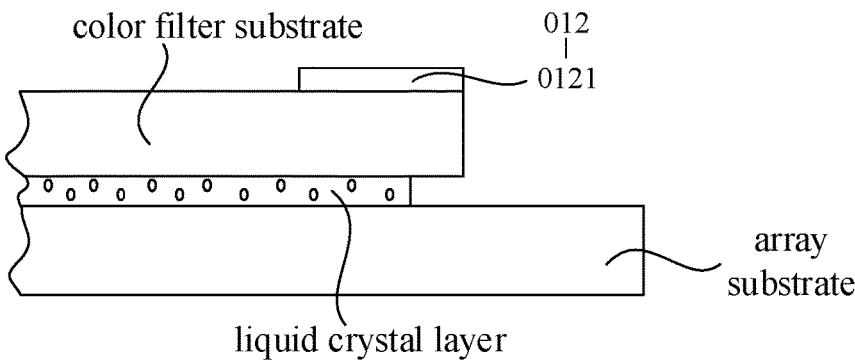
FIG. 13 is a schematic local diagram of still another display device according to an embodiment of the present disclosure.

Referring to FIG. 12, the switch transistor 0121 of the photoelectric sensor assembly 012 may be disposed on a side, proximal to the liquid crystal layer, of the array substrate 01221, and disposed in the region of the array substrate that is not overlapped with both the color filter substrate and the liquid crystal layer. Alternatively, referring to FIG. 13, the switch transistor 0121 of the photoelectric sensor assembly 012 may be disposed on a side, distal from the liquid crystal layer, of the color filter substrate. In this case, the switch transistor 0121 of the photoelectric sensor assembly 012 needs to be disposed on a side, of one portion disposed in the peripheral region 011b, of the color filter substrate.

In this embodiment, the display panel 011 may also be an OLED display panel or an LED display panel, and the type of the display panel 011 is not limited herein. In the case that the display panel 011 is the OLED display panel or the LED display panel, the switch transistor 0121 of the photoelectric sensor assembly 012 only needs to be disposed in the peripheral region 011b of the display panel 011.

In some embodiments, in the embodiment of the present disclosure, the switch transistor 0121 of the photoelectric sensor assembly 012 may be an amorphous silicon (a-Si) thin film transistor, a low temperature poly-silicon (LTPS) thin transistor, or an oxide thin film transistor.

In the embodiment of the present disclosure, the photoelectric sensor assembly 012 includes the switch transistor 0121 and the photodiode 0122, and the switch transistor 0121 may be integrated into the display panel 011 or disposed on the flexible circuit board attached to the display panel 011. An arrangement of the switch transistors 0121 is not fixed, and thus an arrangement of the plurality of photoelectric sensor assemblies 012 generally refers to an arrangement of the photodiodes 0122 of the plurality of photoelectric sensor assemblies 012.

For example, the plurality of first photoelectric sensor assemblies 012a being arranged along the first direction X indicates that: the photodiodes 0122 of the plurality of first photoelectric sensor assemblies 012a are arranged along the first direction X. The plurality of second photoelectric sensor assemblies 012b being arranged along the second direction Y indicates that: the photoelectric diodes 0122 of the plurality of second photoelectric sensor assemblies 012b are arranged along the second direction Y.

Figure 14:
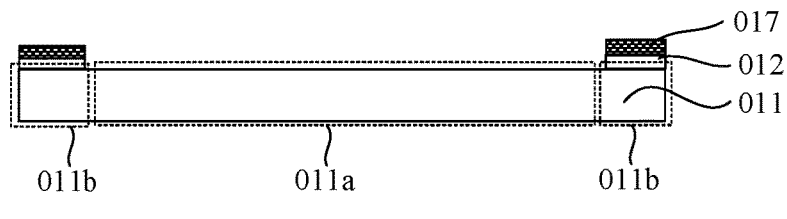
FIG. 14 is a schematic structural diagram of still another display device according to an embodiment of the present disclosure.

FIG. 14 is a schematic structural diagram of still another display device according to an embodiment of the present disclosure. Referring to FIG. 14, the display device may further include: a plurality of filters 017 in one-to-one correspondence to the plurality of photoelectric sensor assemblies 012. Each of the filters 017 may be disposed on a side, distal from the display panel 011, of a corresponding photoelectric sensor assembly 012. The filters may be configured to transmit the infrared light and absorb visible light.

By disposing the filter 017 on a side, distal from the display panel 011, of the photoelectric sensor assembly 012 to filter out the visible light, the optical signal received by the photoelectric sensor assembly 012 is prevented from being affected by light emitted by the display panel 011, thereby ensuring the accuracy of the determined gaze position.

In summary, the embodiment of the present disclosure provides a display device. Because the processing circuit in the display device has the high efficiency in processing the electric signal transmitted by each of the photoelectric sensor assemblies, the processor circuit may quickly determine the gaze position of the eyes of the user on the display panel based on the electric signal of each of the photoelectric sensor assemblies. In this way, an efficiency of displaying the images by the display panel is further improved, and thus the higher refresh rate of the display panel is achieved.

Figure 15:
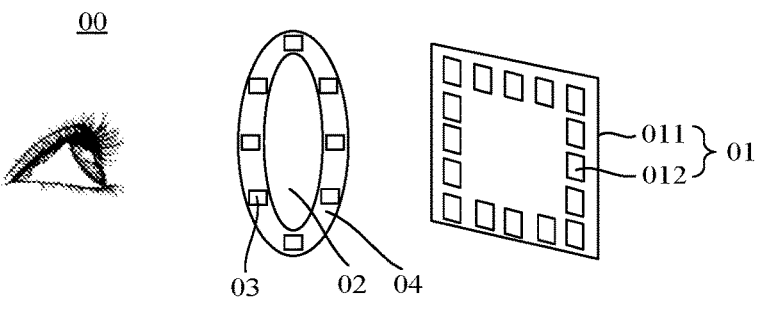
FIG. 15 is a schematic diagram of a wearable display device according to an embodiment of the present disclosure.

FIG. 15 is a schematic diagram of a wearable display device according to an embodiment of the present disclosure. Referring to FIG. 15, the wearable display device 00 may include: the display device 01 as described above, a lens 02 disposed on a display side of the display device 01, and a plurality of light-emitting elements 03 disposed on an edge of the lens 02. Light-exiting directions of the plurality of light-emitting elements 03 face away from the display device 01. FIG. 15 only shows a display panel 011 of the display device 01 and a plurality of photoelectric sensor assemblies 012.

In the embodiment of the present disclosure, light emitted by each of the light-emitting elements 03 may be irradiated to eyes of a user, and the light emitted by the light-emitting element 03 is irradiated to the photoelectric sensor assembly 012 upon being reflected via the eyes of the user. In this way, the photoelectric sensor assembly 012 may receive an optical signal reflected via the eyes of the user.

Referring to FIG. 15, the wearable display device 00 further includes a lens frame 04. The lens frame is disposed on the edge of the lens 02 to fix the lens 02. The plurality of light-emitting elements 03 may be fixed on a side, distal from the display panel 011, of the lens frame 03.

In some embodiments, the plurality of light-emitting elements 03 may be arranged evenly on the side, distal from the display panel 011, of the lens frame 04 to ensure a uniformity of the light irradiated to the eyes of the user. In this way, a processing circuit 013 of the display device 01 is configured to determine an accuracy of a gaze position of the eyes of the user on the display panel 011 based on an electric signal transmitted by each of the photoelectric sensor assemblies 012.

In some embodiments, the plurality of light-emitting elements 03 are infrared light-emitting diodes Because a pupil, a sclera, and an iris of the eye of the user are different in reflectivity to infrared light, by designing the light-emitting element 03 as the infrared light-emitting diode, an optical signal of infrared light reflected via the pupil, an optical signal of infrared light reflected via the sclera, and an optical signal of infrared light reflected via the iris that are received by the photoelectric sensor assembly 012, are greatly different. In this way, it is convenient for the processing circuit 013 to determine the gaze position of the eyes of the user (the pupils) on the display panel 011.

In summary, the embodiment of the present disclosure provides a wearable display device. Because the processing circuit in the display device of the wearable display device has a high efficiency in processing the electric signal transmitted by each of the photoelectric sensor assemblies, the processing circuit may quickly determine the gaze position of the eyes of the user on the display panel based on the electric signal transmitted by each of the photoelectric sensor assemblies. In this way, an efficiency of displaying the images by the display panel is further improved, and thus a higher refresh rate of the display panel is achieved.

Figure 16:
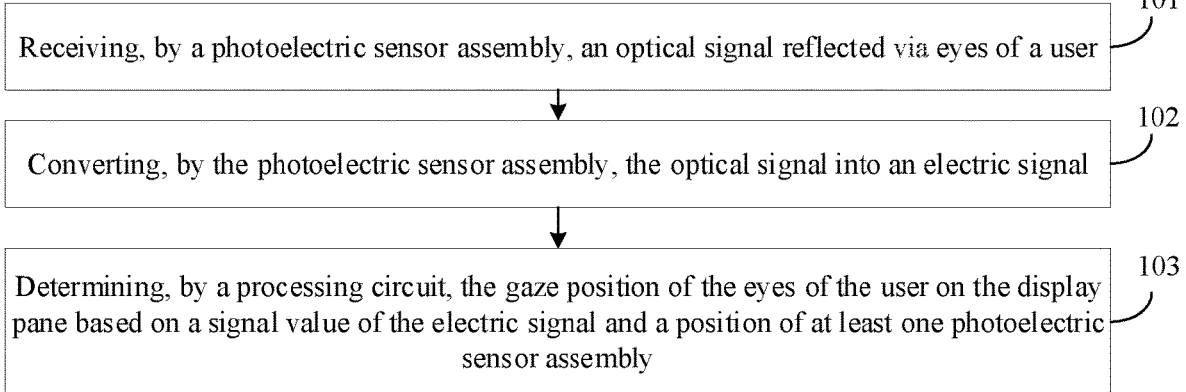
FIG. 16 is a flowchart of a method for determining gaze positions according to an embodiment of the present disclosure.

FIG. 16 is a flowchart of a method for determining gaze positions according to an embodiment of the present disclosure. The method is applicable to the display device according to the embodiments described above. Referring to FIG. 16, the method may include the following steps.

In step 101, a photoelectric sensor assembly receives an optical signal reflected via eyes of a user.

In the embodiment of the present disclosure, the display device includes a display panel 011 and a plurality of photoelectric sensor assemblies 012. The display panel 011 includes a display region 011a and a peripheral region 011b surrounding the display region 011a. The plurality of photoelectric sensor assemblies 012 may be disposed in the peripheral region 011b, wherein each of the photoelectric sensor assemblies 012 may receive the optical signal reflected via the eyes of the user.

In step 102, the photoelectric sensor assembly converts the optical signal into an electric signal.

In the embodiment of the present disclosure, each of the photoelectric sensor assemblies 012 may convert the received optical signal into the electric signal upon receiving the optical signal reflected via the eyes of the user.

In step 103, a processing circuit determines the gaze position of the eyes of the user on the display pane based on a signal value of the electric signal and a position of at least one photoelectric sensor assembly.

In the embodiment of the present disclosure, the display device further includes the processing circuit 013. The processing circuit 013 is connected to each of the photoelectric sensor assemblies 012, and receives the electric signal transmitted by each of the photoelectric sensor assemblies 012. The processing circuit 013 may determine the gaze position of the eyes of the user on the display panel 011 based on the electric signal transmitted by each of the photoelectric sensor assemblies 012 upon receiving the electric signal transmitted by each of the photoelectric sensor assemblies 012.

In the embodiment of the present disclosure, the positions of the photoelectric sensor assemblies 012 may be pre-stored in the processing circuit 013. Because different regions of human eyes are different in reflectivity to light (e.g., infrared light), optical signals, reflected via different regions of the human eyes, received by the photoelectric sensor assembly 012 are different. The photoelectric sensor assemblies 012 have different signal values of electric signals converted from different optical signals. In this way, the processing circuit may determine the gaze position of the eyes of the user on the display panel 011 based on the signal value of the electric signal and the position of the photoelectric sensor assembly 012.

In general, an amount of data of the electric signals is small, but an amount of data of images is large. Therefore, an efficiency of the processing circuit 013 in processing the electric signals is higher than an efficiency of the processing circuit 013 in processing the images. In the embodiment of the present disclosure, the processing circuit 013 has a high efficiency in processing the electric signal transmitted by each of the photoelectric sensor assemblies 012, and may quickly determine the gaze position of the eyes of the user on the display panel 011 based on the electric signal. In this way, an efficiency of displaying the images by the display panel 011 is further improved, and thus a higher refresh rate of the display panel 011 is achieved.

In summary, the embodiment of the present disclosure provides a method for determining gaze positions. Because the processing circuit in the display device has the high efficiency in processing the electric signal transmitted by each of the photoelectric sensor assemblies, the processing circuit may quickly determine the gaze position of the eyes of the user on the display panel based on the electric signal transmitted by each of the photoelectric sensor assemblies. In this way, the efficiency of displaying the images by the display panel is further improved, and thus the higher refresh rate of the display panel is achieved.

Figure 17:
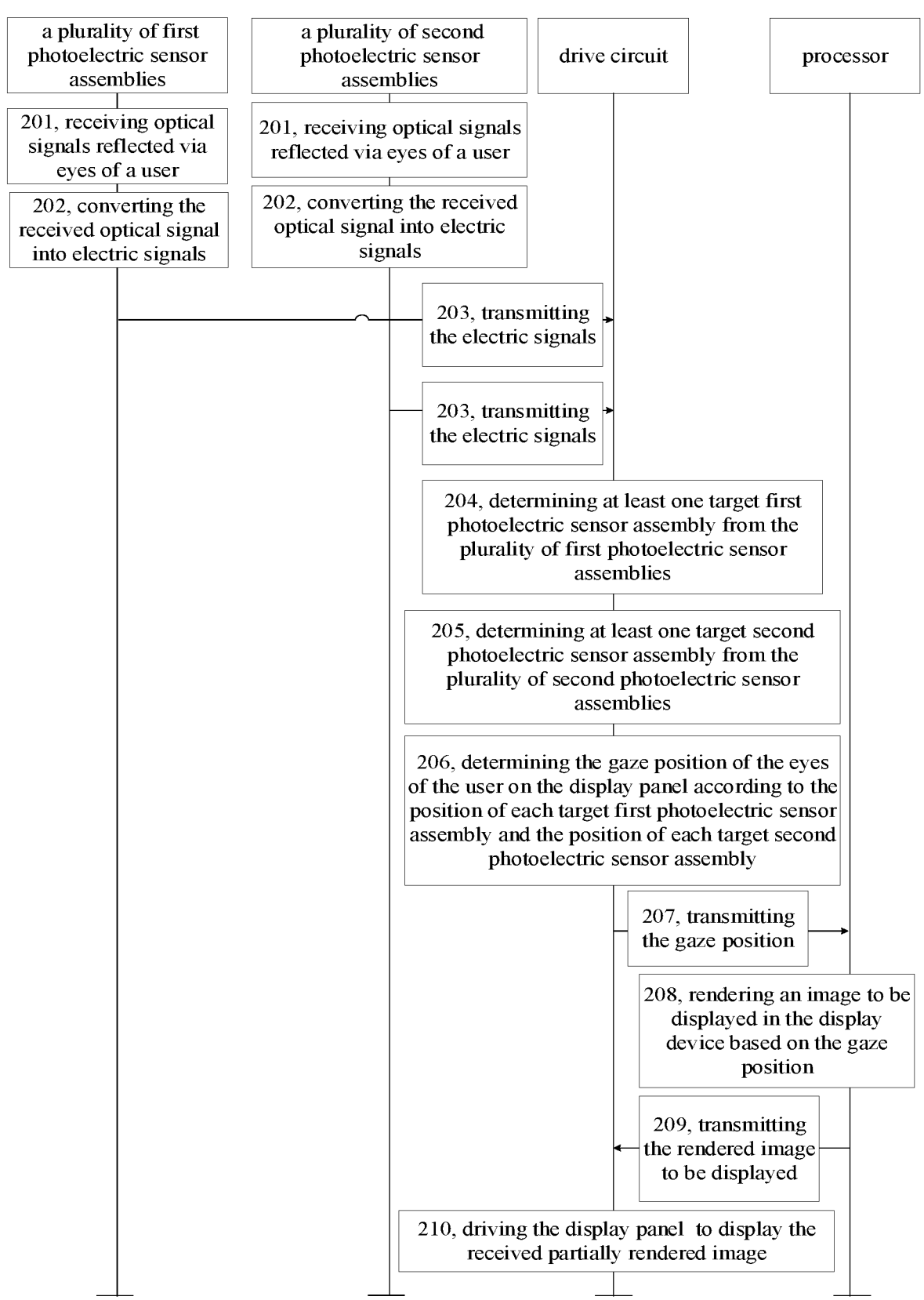
FIG. 17 is a flowchart of another method for determining gaze positions according to an embodiment of the present disclosure.

FIG. 17 is a flowchart of another method for determining gaze positions according to an embodiment of the present disclosure. The method is applicable to the display device according to the embodiments described above. Referring to FIG. 17, the method may include the following steps.

In step 201, a plurality of first photoelectric sensor assemblies and a plurality of second photoelectric sensor assemblies receive optical signals reflected via eyes of a user.

In the embodiment of the present disclosure, the display device 01 includes a display panel 011 and a plurality of photoelectric sensor assemblies 012. The display panel 011 includes a display region 011*a* and a peripheral region 011*b* surrounding the display region 011*a*. A user is generally disposed on a display side of the display panel 011 to check images displayed in the display panel 011. Moreover, the plurality of photoelectric sensor assemblies 012 may be disposed on the display side of the display panel 011, and disposed in the peripheral region 011*b*.

The display side of the display panel 011 is further provided with a light-emitting element 03, and light emitted by the light-emitting element 03 is irradiated to the eyes of the user. The eyes of the user may reflect the light emitted by the light-emitting element 03. Moreover, the light emitted by the light-emitting element 03 is irradiated to the plurality of photoelectric sensor assemblies 012 upon being reflected via the eyes of the user. In this way, the plurality of photoelectric sensor assemblies 012 may receive the optical signals reflected via the eyes of the user.

In some embodiments, the plurality of photoelectric sensor assemblies 012 include the plurality of first photoelectric sensor assemblies 012*a* arranged along a first direction X and the plurality of second photoelectric sensor assemblies 012*b* arranged along a second direction Y. The plurality of first photoelectric sensor assemblies 012*a* and the plurality of second photoelectric sensor assemblies 012*b* may receive the optical signals reflected via the eyes of the user.

In step 202, each of the photoelectric sensor assemblies in the plurality of first photoelectric sensor assemblies and the plurality of second photoelectric sensor assemblies converts the received optical signals into electric signals.

In the embodiment of the present disclosure, in the case that the plurality of first photoelectric sensor assemblies 012*a* and the plurality of second photoelectric sensor assemblies 012*b* receive the optical signals, each of the photoelectric sensor assemblies 012 may convert the received optical signals into the electric signals. Moreover, a signal value of the electric signal converted by the photoelectric sensor assembly 012 is positively correlated with the optical signal received by the photoelectric sensor assembly 012. That is, the larger the optical signal received by the photoelectric sensor assembly 012, the larger the signal value of the electric signal converted, by the photoelectric sensor assembly 012, from the received optical signal; the smaller the optical signal received by the photoelectric sensor assembly 012, the smaller the signal value of the electric signal converted, by the photoelectric sensor assembly 012, from the received optical signal.

In step 203, each of the photoelectric sensor assemblies transmits the electric signal to a drive circuit.

In the embodiment of the present disclosure, a processing circuit 013 of the display device 01 may be the drive circuit, and the drive circuit may be connected to each of the photoelectric sensor assemblies 012. Each of the photoelectric sensor assemblies 012 may transmit the electric signal to the drive circuit.

In step 204, the drive circuit determines at least one target first photoelectric sensor assembly from the plurality of first photoelectric sensor assemblies.

In the embodiment of the present disclosure, in the case that the drive circuit receives the electric signals transmitted by the plurality of first photoelectric sensor assemblies 012*a*, the at least one target first photoelectric sensor assembly may be determined from the plurality of first photoelectric sensor assemblies 012*a*. Furthermore, the drive circuit may determine a position of each target first photoelectric sensor assembly, for example, determine coordinate values of each target first photoelectric sensor assembly.

A signal value of the electric signal transmitted, by the target first photoelectric sensor assembly, to the drive circuit is less than or equal to a first threshold. The first threshold may be a fixed value pre-stored in the drive circuit. Alternatively, the first threshold may be determined by the drive circuit according to the signal values of the received electric signals of the plurality of first photoelectric sensor assemblies 012a.

For example, the drive circuit may sort signal values of N electric signals transmitted by N first photoelectric sensor assemblies 012a in an ascending order, and determine a signal value in the $n^{th}$ position as the first threshold. N is an integer greater than 1, and n is an integer greater than 1 and less than N/2. Alternatively, the drive circuit may determine a minimum of the signal values of the received electric signals of the plurality of first photoelectric sensor assemblies 012a as the first threshold.

In the case that the first threshold is the minimum of the signal values of the electric signals transmitted by the plurality of first photoelectric sensor assemblies 012a, the drive circuit may determine one target first photoelectric sensor assembly from the plurality of first photoelectric sensor assemblies 012a. Therefore, the drive circuit may determine first coordinate values of the target first photoelectric sensor assembly transmitting the electric signal with the minimum signal value in the plurality of first photoelectric sensor assemblies 012a.

In some embodiments, the first coordinate values may be expressed in terms of (a first abscissa value, a first ordinate value). The first abscissa value may be a coordinate value, in the first direction X, of the target first photoelectric sensor assembly, and the first ordinate value may be a coordinate value, in the second direction Y, of the target first photoelectric sensor assembly. The plurality of first photoelectric sensor assemblies 012a are arranged along the first direction X, and thus a coordinate value, in the second direction Y, of each of the first photoelectric sensor assemblies 012a may be 0. That is, the first ordinate value of the target first photoelectric sensor assembly may be 0.

In step 205, the drive circuit determines at least one target second photoelectric sensor assembly from the plurality of second photoelectric sensor assemblies.

In the embodiment of the present disclosure, in the case that the drive circuit receives the electric signals transmitted by the plurality of second photoelectric sensor assemblies 012b, the at least one target second photoelectric sensor assembly may be determined from the plurality of second photoelectric sensor assemblies 012b. Furthermore, the driver may determine a position of each target second photoelectric sensor assembly, for example, determine coordinate values of each target second photoelectric sensor assembly.

A signal value of the electric signal transmitted, by the target second photoelectric sensor assembly, to the drive circuit is less than or equal to a second threshold. The second threshold may be a fixed value pre-stored in the drive circuit. Alternatively, the second threshold may be determined by the drive circuit according to the signal values of the received electric signals of the plurality of second photoelectric sensor assemblies 012b.

For example, the drive circuit may sort the signal values of M electric signals transmitted by M second photoelectric sensor assemblies 012b in the ascending order, and determine a signal value in the $m^{th}$ position as the threshold. M is an integer greater than 1, and m is an integer greater than 1 and less than M/2. Alternatively, the drive circuit may determine a minimum of the signal values of the received electric signals of the plurality of second photoelectric sensor assemblies 012b as the second threshold.

In the case that the second threshold is the minimum of the signal values of the electric signals transmitted by the plurality of second photoelectric sensor assemblies 012b, the drive circuit may determine one target second photoelectric sensor assembly from the plurality of second photoelectric sensor assemblies 012b. Therefore, the drive circuit may determine second coordinate values of the target second photoelectric sensor assembly transmitting the electric signal with the minimum signal value in the plurality of second photoelectric sensor assemblies 012b.

In some embodiments, the second coordinate values may be expressed in terms of (a second abscissa value, a second ordinate value). The second abscissa value may be a coordinate value, in the first direction X, of the target second photoelectric sensor assembly, and the second ordinate value may be a coordinate value, in the second direction Y, of the target second photoelectric sensor assembly. The plurality of second photoelectric sensor assemblies 012b are arranged along the second direction Y, and thus a coordinate value, in the first direction X, of each of the second photoelectric sensor assemblies 012b may be 0. That is, the second abscissa value of the target second photoelectric sensor assembly may be 0.

In step 206, the drive circuit determines the gaze position of the eyes of the user on the display panel according to the position of each target first photoelectric sensor assembly and the position of each target second photoelectric sensor assembly.

In the embodiment of the present disclosure, in the case that the drive circuit determines the position of each target first photoelectric sensor assembly and the position of each target second photoelectric sensor assembly, the gaze position of the eyes of the user on the display panel 011 may be determined according to the position of each target first photoelectric sensor assembly and the position of each target second photoelectric sensor assembly.

In some embodiments, assuming that the drive circuit determines the plurality of target first photoelectric sensor assemblies, then the drive circuit may determine first coordinate values of each target first photoelectric sensor assembly in the plurality of target first photoelectric sensor assemblies. The first coordinate values of each target first photoelectric sensor assembly may be expressed in terms of (a first abscissa value, a first ordinate value). Afterwards, the drive circuit may determine a first horizontal average value of the first coordinate values of the plurality of target first photoelectric sensor assemblies, and a first vertical average value of the first ordinate values of the plurality of target first photoelectric sensor assemblies.

Because the first ordinate value of each target first photoelectric sensor assembly is 0, the first vertical average value of the first ordinate values of the plurality of target first photoelectric sensor assemblies is also 0.

Correspondingly, assuming that the drive circuit determines the plurality of target second photoelectric sensor assemblies, then the drive circuit may determine second coordinate values of each target second photoelectric sensor assembly in the plurality of target second photoelectric sensor assemblies. The second coordinate values of each target second photoelectric sensor assembly may be expressed in terms of (a second abscissa value, a second ordinate value). Afterwards, the drive circuit may determine a second horizontal average value of the second coordinate values of the plurality of target second photoelectric sensor assemblies, and a second vertical average value of the second ordinate values of the plurality of target second photoelectric sensor assemblies.

Because the second abscissa value of each target second photoelectric sensor assembly is 0, the second horizontal average value of the second ordinate values of the plurality of target second photoelectric sensor assemblies is also 0.

Afterwards, the drive circuit may determine the gaze position of the eyes of the user on the display panel 011 based on the first horizontal average value and the second vertical average value. For example, the gaze position may be expressed by coordinates (the first horizontal average value, the second vertical average value) of the gaze position.

In some embodiments, assuming that the drive circuit determine one target first photoelectric sensor assembly, then the drive circuit may determine first coordinate values of the target first photoelectric sensor assembly. The first coordinate values of the target first photoelectric sensor assembly may be expressed in terms of (a first abscissa value, a first ordinate value).

Correspondingly, assuming that the drive circuit determine one target second photoelectric sensor assembly, then the drive circuit may determine second coordinate values of the target second photoelectric sensor assembly. The second coordinate values of the target second photoelectric sensor assembly may be expressed in terms of (a second abscissa value, a second ordinate value).

Afterwards, the drive circuit may determine the gaze position of the eyes of the user on the display panel 011 based on the first horizontal value and the second ordinate value. For example, the gaze position may be expressed by coordinates (the first coordinate value, the second coordinate value) of the gaze position.

In step 207, the drive circuit transmits the gaze position to a processor of the display device.

In the embodiment of the present disclosure, the display device further includes the processor, and the processor may be connected to the drive circuit. In the case that the drive circuit determines the gaze position of the eyes of the user on the display panel 011, the gaze position may be transmitted to the processor of the display device. For example, the drive circuit may transmit the coordinates of the gaze position to the processor.

In step 208, the processor renders an image to be displayed in the display device based on the gaze position.

In the embodiment of the present disclosure, in the case that the processor receives the gaze position transmitted by the drive circuit, the image to be displayed in the display device may be rendered based on the gaze position.

In some embodiments, the processor may partially render a region where the gaze position is disposed in the image to be displayed. The region of the gaze position may refer to a target region centered on the gaze position. The target region may be circular, rectangular, or the like, and the target region may have a size pre-stored in the processor.

In step 209, the processor transmits the rendered image to be displayed to the drive circuit.

In step 210, the drive circuit may drive the display panel to display the rendered image to be displayed.

In the embodiment of the present disclosure, in the case that the drive circuit receives the rendered image to be displayed transmitted by the processor, the drive circuit may drive the display panel 011 to display the rendered image to be displayed.

It should be noted that, a sequence of steps of the method for determining gaze positions according to the embodiments of the present disclosure may be adjusted appropriately, and the steps may be scaled accordingly. For example, step 205 may be performed synchronously with step 206, and step 207 to step 210 may be deleted accordingly. Any variations within the scope of the technology disclosed in the disclosure made by persons of ordinary skill in the art shall fall within a protection scope of the present disclosure, and are therefore not repeated herein.

In summary, the embodiment of the present disclosure provides a method for determining gaze positions. Because the drive circuit in the display device has a high efficiency in processing the electric signal transmitted by each of the photoelectric sensor assemblies, the drive circuit may quickly determine the gaze position of the eyes of the user on the display panel based on the electric signal transmitted by each of the photoelectric sensor assemblies. In this way, an efficiency of displaying the images by the display panel is further improved, and thus a higher refresh rate of the display panel is achieved.

Figure 18:
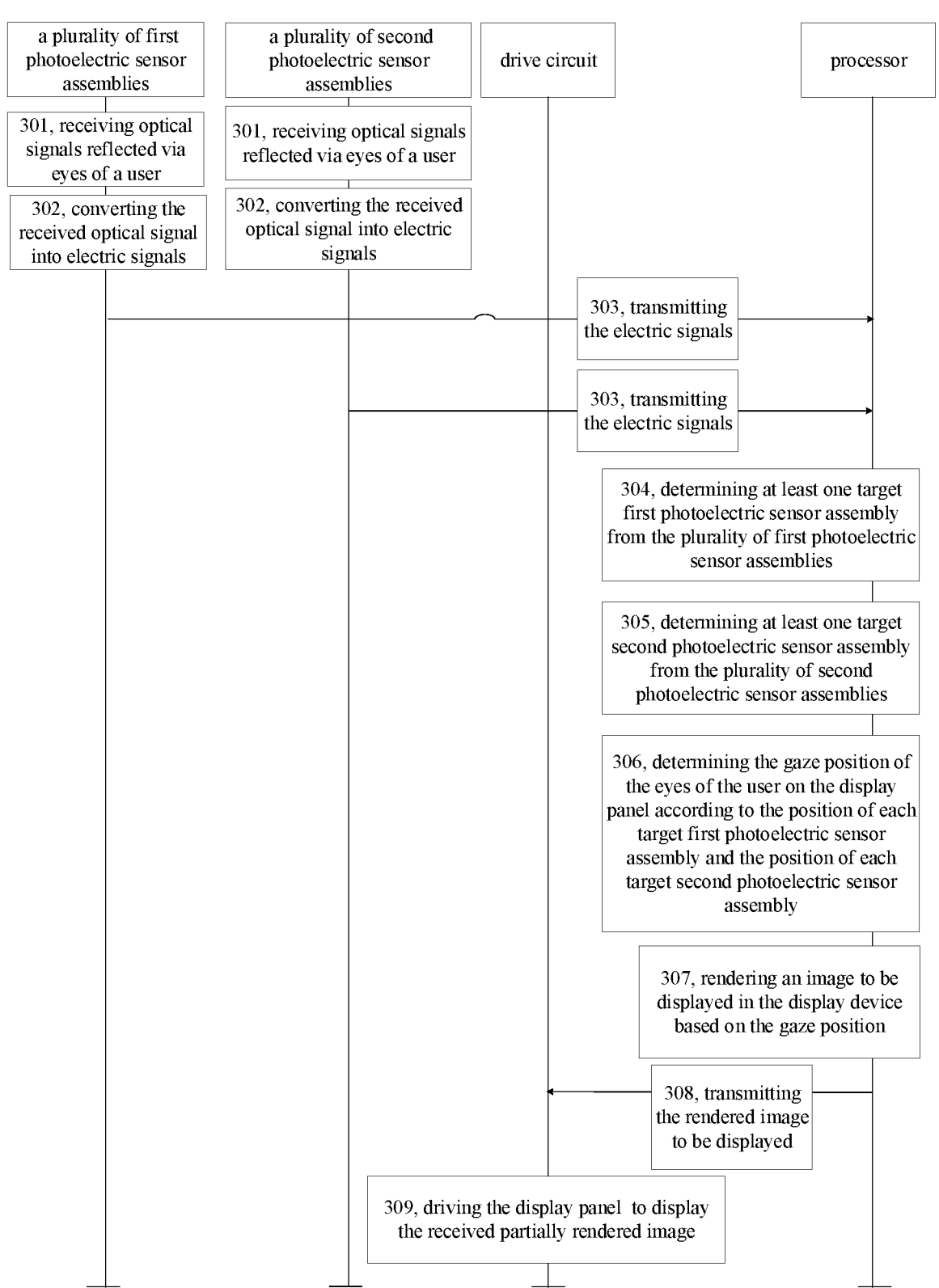
FIG. 18 is a flowchart of yet another method for determining gaze positions according to an embodiment of the present disclosure.

FIG. 18 is a flowchart of yet another method for determining gaze positions according to an embodiment of the present disclosure. The method is applicable to the display device according to the embodiments described above. Referring to FIG. 18, the method may include the following steps.

In step 301, a plurality of first photoelectric sensor assemblies and a plurality of second photoelectric sensor assemblies receive an optical signal reflected via eyes of a user.

In the embodiment of the present disclosure, for detailed description of step 301, reference may be made to an instruction of step 201, which is not repeated herein.

In step 302, each photoelectric sensor assembly 012 in the plurality of first photoelectric sensor assemblies 012a and the plurality of second photoelectric sensor assemblies 012b converts the received optical signal into an electric signal.

In the embodiment of the present disclosure, for detailed description of step 302, reference may be made to an instruction of step 202, which is not repeated herein.

In step 303, each of the photoelectric sensor assemblies transmits the electric signal to a processor.

In the embodiment of the present disclosure, a processing circuit 013 of the display device may be the processor, and the processor may be connected to each of the photoelectric sensor assemblies 012. Each of the photoelectric sensor assemblies may transmit the electric signal to the processor.

In step 304, the processor determines at least one target first photoelectric sensor assembly from the plurality of first photoelectric sensor assemblies.

In the embodiment of the present disclosure, for detailed description of the step 304, reference may be made to step 204. However, step 304 is different from step 204 in that step 304 is performed by the processor, whereas step 204 is performed by the drive circuit.

In step 305, the processor determines at least one target second photoelectric sensor assembly from the plurality of second photoelectric sensor assemblies.

In the embodiment of the present disclosure, for detailed description of step 305, reference may be made to step 205. However, step 305 is different from step 205 in that step 305 is performed by the processor, whereas step 205 is performed by the drive circuit.

In step 306, the processor determines the gaze position of the eyes of the user on the display panel according to a position of each target first photoelectric sensor assembly and a position of each target second photoelectric sensor assembly.

In the embodiment of the present disclosure, for detailed description of step 306, reference may be made to step 206.

However, step 306 is different from step 206 in that step 306 is performed by the processor, whereas step 206 is performed by the drive circuit.

In step 307, the processor renders an image to be displayed in the display device based on the gaze position.

In the embodiment of the present disclosure, the processor determines the gaze position, and thus the processor may directly render the image to be displayed in the display device based on the determined gaze position.

In some embodiments, the processor may partially render a region where the gaze position is disposed in the image to be displayed. The region of the gaze position may refer to a target region centered on the gaze position. The target region may be circular, rectangular, or the like, and the target region may have a size pre-stored in the processor.

In step 308, the processor transmits the rendered image to be displayed to the drive circuit.

In step 309, the drive circuit may drive the display panel to display the rendered image to be displayed.

In the embodiment of the present disclosure, in the case that the drive circuit receives the rendered image to be displayed transmitted by the processor, the drive circuit may drive the display panel to display the rendered image to be displayed.

It should be noted that, a sequence of steps of the method for determining gaze positions according to the embodiments of the present disclosure may be adjusted appropriately, and the steps may be scaled accordingly. For example, step 305 may be performed before step 304, and step 207 to step 210 may be canceled according to actual needs. Any variations within the scope of the technology disclosed in the disclosure made by persons of ordinary skill in the art shall fall within a protection scope of the present disclosure, which are thus not repeated herein.

In summary, the embodiment of the present disclosure provides a method for determining gaze positions. Because the drive circuit in the display device has a high efficiency in processing the electric signal transmitted by each of the photoelectric sensor assemblies, the drive circuit may quickly determine the gaze position of the eyes of the user on the display panel based on the electric signal transmitted by each of the photoelectric sensor assemblies. In this way, an efficiency of displaying images by the display panel is further improved, and thus a higher refresh rate of the display panel is achieved.

An embodiment of the present disclosure provides a non-transitory computer-readable storage medium. The non-transitory computer-readable storage medium stores one or more instructions therein, wherein the one or more instructions, when executed by a display device, cause the display device to perform the method for determining gaze positions as described above.

An embodiment of the present disclosure provides a computer program product storing one or more instructions therein, wherein the one or more instructions, when loaded and executed by a computer, cause the computer to perform the method for determining gaze positions as described above.

Described above are merely optional embodiments of the present disclosure, and are not intended to limit the present disclosure. Within the spirit and principles of the present disclosure, any modifications, equivalent substitutions, improvements, and the like, should be within the protection scope of the present disclosure.

What is claimed is:

1. A display device, comprising:

a display panel, comprising a display region and a peripheral region surrounding the display region;

a plurality of photoelectric sensor assemblies, disposed in the peripheral region, wherein each of the photoelectric sensor assemblies is configured to receive an optical signal reflected via eyes of a user and convert the optical signal into an electric signal; and a processing circuit, connected to each of the photoelectric sensor assemblies, wherein the processing circuit is configured determine a gaze position of the eyes of the user on the display panel based on a signal value of the electric signal transmitted by each of the photoelectric sensor assemblies and a position of at least one of the photoelectric sensor assemblies;

wherein the display panel comprises a plurality of subpixels disposed in the display region, each of the subpixels comprising at least one pixel transistor;

each of the photoelectric sensor assemblies comprises: a switch transistor and a photodiode; wherein the photodiode comprises: a base, and a pixel electrode, a P-type material layer, a photosensitive layer, an N-type material layer and a common electrode that are disposed on a side of the base and successively stacked along a direction away from the base;

the photodiode further comprises a drive chip disposed on the side of the base and a connection trace disposed on a same layer with the pixel electrode; wherein one end of the connection trace is connected to the drive chip, and another end of the connection trace is connected to the common electrode; and the drive chip is configured to supply a signal to the common electrode by the connection trace; and a first electrode of the switch transistor is electrically connected to the pixel electrode, and a second electrode of the switch transistor is electrically connected to the processing circuit;

the switch transistor and the pixel transistor are prepared by a same preparation process, and the switch transistor is integrated into the display panel; and each of the photoelectric sensor assemblies comprise a first bonding pattern and a second bonding pattern that are electrically connected, wherein the first bonding pattern is electrically connected to the first electrode of the switch transistor, and the second bonding pattern is electrically connected to the pixel electrode of the photodiode;

wherein an anisotropic conductive film is disposed between the first bonding pattern and the second bonding pattern, the first bonding pattern is bonded and connected to the second bonding pattern by the anisotropic conductive film, the second bonding pattern is disposed in a same layer with the pixel electrode of the photodiode, a gap is formed between the second bonding pattern and the pixel electrode, and an orthographic projection of the first bonding pattern on the display panel is overlapped with an orthographic projection of the second bonding pattern on the display panel.

2. The display device according to claim 1, wherein the peripheral region comprises: a first region extending along a first direction and a second region extending along a second direction, wherein the first direction is intersected with the second direction; and the plurality of photoelectric sensor assemblies comprise a plurality of first photoelectric sensor assemblies and a plurality of second photoelectric sensor assemblies;

wherein the plurality of first photoelectric sensor assemblies are disposed in the first region and arranged along the first direction, and the plurality of second photoelectric sensor assemblies are disposed in the second region and arranged along the second direction.

3. The display device according to claim 2, wherein the first direction is perpendicular to the second direction; and the peripheral region comprises: two first regions and two second regions;

wherein the two first regions are arranged along the second direction and respectively disposed on two sides of the display region, and the two second regions are arranged along the first direction and respectively disposed on the two sides of the display region.

4. The display device according to claim 2, wherein the processing circuit is configured to:

determine first coordinate values of a target first photoelectric sensor assembly transmitting an electric signal with a minimum signal value in the plurality of first photoelectric sensor assemblies;

determine second coordinate values of a target second photoelectric sensor assembly transmitting an electric signal with a minimum signal value in the plurality of second photoelectric sensor assemblies; and determine the gaze position of the eyes of the user on the display panel based on the first coordinate values and the second coordinate values.

5. The display device according to claim 1, further comprising a control circuit; wherein a control electrode of the switch transistor is electrically connected to the control circuit, and the control circuit is configured to control on or off of the switch transistor.

6. The display device according to claim 1, wherein the processing circuit is a drive circuit; wherein the drive circuit is further configured to drive, based on the gaze position of the eyes of the user on the display panel, the display panel to display images.

7. The display device according to claim 1, wherein the pixel electrode is distal from the display panel relative to the common electrode, and the pixel electrode is made of a transparent material.

8. The display device according to claim 5, further comprising a flexible circuit board attached to the peripheral region;

wherein the switch transistor is disposed on the flexible circuit board.

9. The display device according to claim 8, wherein the processing circuit is a processor; and the display device further comprises a drive circuit connected to the processor;

wherein the processor is configured to transmit the gaze position of the eyes of the user on the display panel to the drive circuit, and the drive circuit is configured to drive, based on the gaze position, the display panel to display images.

10. The display device according to claim 8, wherein the common electrode is distal from the display panel relative to the pixel electrode, and the common electrode is made of a transparent material.

11. The display device according to claim 1, further comprising: a plurality of filters in one-to-one correspondence to the plurality of photoelectric sensor assemblies, each of the filters being disposed on a side, distal from the display panel, of a corresponding photoelectric sensor assembly;

wherein the filter is configured to transmit infrared light and absorb visible light.

12. A wearable display device, comprising: a display device, a lens disposed on a display side of the display device, and a plurality of light-emitting elements disposed on an edge of the lens; wherein the display panel comprises:

a display region and a peripheral region surrounding the display region;

a plurality of photoelectric sensor assemblies, disposed in the peripheral region, wherein each of the photoelectric sensor assemblies is configured to receive an optical signal reflected via eyes of a user and convert the optical signal into an electric signal; and a processing circuit, connected to each of the photoelectric sensor assemblies, wherein the processing circuit is configured determine a gaze position of the eyes of the user on the display panel based on a signal value of the electric signal transmitted by each of the photoelectric sensor assemblies and a position of at least one of the photoelectric sensor assemblies;

wherein the display panel comprises a plurality of subpixels disposed in the display region, each of the subpixels comprising at least one pixel transistor;

each of the photoelectric sensor assemblies comprises:

a switch transistor and a photodiode; wherein the photodiode comprises: a base, and a pixel electrode, a P-type material layer, a photosensitive layer, an N-type material layer and a common electrode that are disposed on a side of the base and successively stacked along a direction away from the base;

the photodiode further comprises a drive chip disposed on the side of the base and a connection trace disposed on a same layer with the pixel electrode; wherein one end of the connection trace is connected to the drive chip, and another end of the connection trace is connected to the common electrode; and the drive chip is configured to supply a signal to the common electrode by the connection trace; and a first electrode of the switch transistor is electrically connected to the pixel electrode, and a second electrode of the switch transistor is electrically connected to the processing circuit;

the switch transistor and the pixel transistor are prepared by a same preparation process, and the switch transistor is integrated into the display panel; and each of the photoelectric sensor assemblies comprise a first bonding pattern and a second bonding pattern that are electrically connected, wherein the first bonding pattern is electrically connected to the first electrode of the switch transistor, and the second bonding pattern is electrically connected to the pixel electrode of the photodiode;

wherein an anisotropic conductive film is disposed between the first bonding pattern and the second bonding pattern, the first bonding pattern is bonded and connected to the second bonding pattern by the anisotropic conductive film, the second bonding pattern is disposed in a same layer with the pixel electrode of the photodiode, a gap is formed between the second bonding pattern and the pixel electrode, and an orthographic projection of the first bonding pattern on the display panel is overlapped with an orthographic projection of the second bonding pattern on the display panel; and

light-exiting directions of the plurality of light-emitting elements face away from the display device.

13. The wearable display device according to claim 12, wherein the plurality of light-emitting elements are infrared light-emitting diodes.

14. A method for determining gaze positions, applicable to a display device, wherein the display device comprises:

a display panel, comprising a display region and a peripheral region surrounding the display region;

a plurality of photoelectric sensor assemblies, disposed in the peripheral region, wherein each of the photoelectric sensor assemblies is configured to receive an optical signal reflected via eyes of a user and convert the optical signal into an electric signal; and a processing circuit, connected to each of the photoelectric sensor assemblies, wherein the processing circuit is configured determine a gaze position of the eyes of the user on the display panel based on a signal value of the electric signal transmitted by each of the photoelectric sensor assemblies and a position of at least one of the photoelectric sensor assemblies;

wherein the display panel comprises a plurality of subpixels disposed in the display region, each of the subpixels comprising at least one pixel transistor;

each of the photoelectric sensor assemblies comprises:

a switch transistor and a photodiode; wherein the photodiode comprises: a base, and a pixel electrode, a P-type material layer, a photosensitive layer, an N-type material layer and a common electrode that are disposed on a side of the base and successively stacked along a direction away from the base;

the photodiode further comprises a drive chip disposed on the side of the base and a connection trace disposed on a same layer with the pixel electrode; wherein one end of the connection trace is connected to the drive chip, and another end of the connection trace is connected to the common electrode; and the drive chip is configured to supply a signal to the common electrode by the connection trace; and a first electrode of the switch transistor is electrically connected to the pixel electrode, and a second electrode of the switch transistor is electrically connected to the processing circuit;

the switch transistor and the pixel transistor are prepared by a same preparation process, and the switch transistor is integrated into the display panel; and each of the photoelectric sensor assemblies comprise a first bonding pattern and a second bonding pattern that are electrically connected, wherein the first bonding pattern is electrically connected to the first electrode of the switch transistor, and the second bonding pattern is electrically connected to the pixel electrode of the photodiode;

wherein an anisotropic conductive film is disposed between the first bonding pattern and the second bonding pattern, the first bonding pattern is bonded and connected to the second bonding pattern by the anisotropic conductive film, the second bonding pattern is disposed in a same layer with the pixel electrode of the photodiode, a gap is formed between the second bonding pattern and the pixel electrode, and an orthographic projection of the first bonding pattern on the display panel is overlapped with an orthographic projection of the second bonding pattern on the display panel;

26 the method comprising:

receiving an optical signal reflected via eyes of a user;

converting the optical signal into an electric signal; and determining a gaze position of the eyes of the user on a display panel based on a signal value of the electric signal and a position of at least one photoelectric sensor assembly.

15. The method for determining according to claim 14, wherein determining the gaze position of the eyes of the user on the display panel based on the electric signal comprises:

determining, by a drive circuit in the display device, the gaze position of the eyes of the user on the display panel based on the electric signal;

the method further comprises:

transmitting, by the drive circuit, the gaze position to a processor of the display device;

rendering, by the processor, an image to be displayed in the display device based on the gaze position, and transmitting the rendered image to be displayed to the drive circuit; and driving, by the drive circuit, the display panel to display the rendered image to be displayed.

16. The method for determining according to claim 14, wherein determining the gaze position of the eyes of the user on the display panel based on the electric signal comprises:

determining, by a processor in the display device, the gaze position of the eyes of the user on the display panel based on the electric signal; and the method further comprises:

rendering, by the processor, an image to be displayed in the display device based on the gaze position, and transmitting the rendered image to be displayed to a drive circuit; and driving, by the drive circuit, the display panel to display the rendered image to be displayed.

17. The method for determining according to claim 14, wherein determining the gaze position of the eyes of the user on the display panel based on the electric signal comprises:

determining at least one target first photoelectric assembly from a plurality of first photoelectric sensor assemblies arranged along a first direction;

determining at least one target second photoelectric sensor assembly from a plurality of second photoelectric sensor assemblies arranged along a second direction; and determining the gaze position of the eyes of the user on the display panel based on a position of each of the target first photoelectric sensor assemblies and a position of each of the target second photoelectric sensor assemblies;

wherein a signal value of an electric signal transmitted by the target first photoelectric sensor assembly is less than or equal to a first threshold, and a signal value of an electric signal transmitted by the target second photoelectric sensor assembly is less than or equal to a second threshold.

18. The method for determining according to claim 14, wherein determining the gaze position of the eyes of the user on the display panel based on the electric signal comprises:

determining first coordinate values of the target first photoelectric sensor assembly transmitting an electric signal with a minimum signal value in the plurality of first photoelectric sensor assemblies arranged along the first direction;

determining second coordinate values of the target second photoelectric sensor assembly transmitting an electric signal with a minimum signal value in the plurality of second photoelectric sensor assemblies arranged along the second direction; and determining the gaze position of the eyes of the user on the display panel based on the first coordinate values and the second coordinate values;

wherein the first direction is intersected with the second direction.

\* \* \* \* \*